United States Patent [19]

Peterson

[11] Patent Number: 5,683,644
[45] Date of Patent: Nov. 4, 1997

[54] METHOD FOR STRIPPING OPEN ENDED BELLOWS PART FROM INJECTION MOLD

[75] Inventor: Robert J. Peterson, Loveland, Ohio

[73] Assignee: The Procter & Gamble Company, Cincinnati, Ohio

[21] Appl. No.: 557,982

[22] Filed: Nov. 13, 1995

[51] Int. Cl.$^6$ .................. B29C 45/43; B29C 45/44
[52] U.S. Cl. ............... 264/318; 249/68; 264/335; 425/437; 425/438
[58] Field of Search ................. 264/318, 335; 425/437, 438; 249/68

[56] References Cited

U.S. PATENT DOCUMENTS

| | | | |
|---|---|---|---|
| 2,396,406 | 3/1946 | Anderson | 425/96 |
| 2,547,894 | 4/1951 | Treckman | 425/437 |
| 3,183,551 | 5/1965 | Johnson | 425/437 |
| 3,660,002 | 5/1972 | Morroni | 425/405 |
| 3,733,384 | 5/1973 | Gerlovich et al. | 264/540 |
| 3,892,512 | 7/1975 | Diehl | 425/438 |
| 3,950,468 | 4/1976 | Rainville | 264/318 |
| 4,164,523 | 8/1979 | Hanning | 264/335 |
| 4,375,948 | 3/1983 | Von Holdt | 425/437 |
| 4,438,065 | 3/1984 | Brown | 264/335 |
| 4,524,943 | 6/1985 | Busch et al. | 249/63 |
| 4,531,703 | 7/1985 | Underwood | 249/66.1 |
| 4,653,997 | 3/1987 | Sheffield et al. | 425/556 |
| 5,006,376 | 4/1991 | Arima et al. | 428/34.1 |
| 5,310,518 | 5/1994 | Franzini et al. | 264/326 |
| 5,490,966 | 2/1996 | Peterson et al. | 264/318 |

FOREIGN PATENT DOCUMENTS

| | | |
|---|---|---|
| 2395121 | 6/1977 | France . |
| 58-187330 | 11/1983 | Japan ........ 425/437 |
| 59-204527 | 11/1984 | Japan ........ 264/318 |
| 60-229716 | 11/1985 | Japan ........ 425/437 |
| 61-197209 | 9/1986 | Japan ........ 425/437 |
| 61-262112 | 11/1986 | Japan ........ 425/438 |

Primary Examiner—Robert Davis
Attorney, Agent, or Firm—Ronald W. Kock

[57] ABSTRACT

A method for stripping a resilient bellows part from an injection mold has a step of injection molding a resilient bellows part around a colinear core pin and a stripper rod, surrounded by a split cavity. The bellows part has two open ends, one of which is substantially rigid and is closed by the stripper rod passing through it. The second open end is resilient. Another step opens the split cavity to permit the bellows part to be stripped from the core pin. Yet another step expands the bellows part radially outward from the core pin. Simultaneously with expanding the bellows part, a step of pushing the substantially rigid open end of the bellows part by the stripper rod causes the resilient portion and resilient open end to be stripped off the core pin. Finally, the substantially rigid open end of the bellows part is ejected from the stripper rod.

3 Claims, 2 Drawing Sheets

METHOD FOR STRIPPING OPEN ENDED BELLOWS PART FROM INJECTION MOLD

FIELD OF THE INVENTION

The present invention relates to the manufacture of molded bellows parts, and more particularly to such bellows pans wherein both ends are open. Even more particularly, the present invention relates to methods for stripping open ended bellows parts from an injection mold.

BACKGROUND OF THE INVENTION

Resiliently deformable bellows are used as sealing boots around flexible couplings, as flexible couplings themselves, as collapsible containers, etc. A particular application of interest for a bellows is as a replacement for a piston, return spring, and cylinder in pump devices, particularly lotion pumps and trigger sprayers.

Pump devices require pressurization of a fluid in order to dispense the fluid. Pistons and cylinders have historically been used to generate fluid pressure. In a trigger sprayer which is used predominantly for low viscosity fluids, for example, a piston and cylinder arrangement provide either high friction and good fluid sealing, or low friction and a certain mount of bypass leakage. Neither of these combinations is desirable. Piston and cylinders are also known for binding during axial movement, which causes erratic actuator motion.

A cylindrical resilient bellows serves as both a pumping chamber and a return spring. The bellows changes volume by virtue of axial deformation. A bellows has a series of interconnected pleats which have walls that act as conical ting springs. The summation of conical ting bending resistances for all of the individual pleats determines the axial resilience of the bellows. The primary advantage of a bellows is that it can provide a lower actuation force than a piston, return spring, and cylinder combination. A bellows resistance to axial deflection is less than the sliding friction between piston and cylinder and the force of a piston return spring. Also, a bellows is a single part, and therefore it has no assembly and critical fit considerations. Because there are no sliding parts, there is no dynamic sealing required for a bellows.

A bellows is static, ally sealed to the moving parts of a pump device. This is typically achieved by connecting two open ends of a bellows to rigid actuator parts by snap-fitting or thermal or adhesive bonding. The actuator parts may contain one-way valving so that when the actuator is released, the bellows pumping chamber expands due to bellows resilience, thereby drawing in fluid through an inlet valve. When the actuator is actuated, the bellows pumping chamber contracts, pressurizing the fluid as the inlet valve closes while an exit valve opens to discharge the fluid.

Manufacturing a bellows with both ends open is not without difficulties. Such bellows may be made by blow molding or by injection molding. Blow molding is a simpler process, but it results in less precise wall thickness of the conical ring portions of the pleats. Resistance to bellows pleat deflection is a function of conical ring thickness cubed. Therefore, trigger sprayer bellows are made by injection molding so that their axial deflection resistance is more controllable. Also, injection molding permits the addition of other functional elements, such as valves and valve springs, atomizer elements, etc., molded integrally with the bellows.

Injection molding of bellows is a well known process. The trick of course, when injection molding any part with radial undulations or undercuts, is stripping the part from the mold elements. Typically, injection molded bellows are hand stripped off a mold core pin. Such stripping of a still warm part often results in permanent damage to the bellows from abrasion with the mold. Alternatively, bellows have been molded with one end closed so that air can be used to inflate the bellows to blow it off the core pin. However, the resulting bellows must thereafter undergo a post processing operation to remove the closed end, and additional scrap results.

U.S. Pat. No. 5,006,376 to Arima et al., issued Apr. 9, 1991, discloses an open ended conical bellows shape which has specific proportions and is made of specific material in order that it may be stripped from an injection mold. The extreme limitations on proportions and materials exemplifies the difficulty of stripping a bellows from a mold without damaging the bellows.

What has been missing is a method for injection molding a bellows having both ends open as molded, which uses a compressed gas to expand the bellows while it is pushed off the core pin of the mold. Such a method, which is automated to have low cycle time and which requires no external mechanisms, is an object of the present invention.

SUMMARY OF THE INVENTION

In one aspect of the present invention, a method for stripping a resilient bellows part from an injection mold comprises the step of injection molding a resilient bellows part around a core pin and a stripper rod while a split cavity surrounds the core pin and the stripper rod. The core pin and the stripper rod have a substantially colinear longitudinal axis. The resilient bellows part has a substantially rigid first open end and a resilient second open end. The method further comprises opening the split cavity to permit the resilient bellows part to be stripped from the core pin and expanding the resilient bellows part radially outward from the core pin. Another step comprises pushing the resilient bellows part at the substantially rigid first open end by the stripper rod to remove the resilient bellows part from the core pin while the resilient bellows part is expanded outwardly from the core pin. The stripping method uses only components built into the injection mold. The core pin has a clearance hole connected to a source of compressed gas. The clearance hole gains fluid communication with the resilient bellows part when the stripper rod moves axially from the core pin to push the substantially rigid first open end. The step of expanding the resilient bellows part comprises passing compressed gas from the source through the clearance hole of the core pin to the resilient bellows part.

In another aspect of the present invention, a method for stripping a resilient bellows part from an injection mold comprises the step of injection molding a resilient bellows part. The resilient bellows part has a resilient portion located between a core pin and a split cavity and a substantially rigid portion located between a stripper rod and the split cavity. The substantially rigid portion has a first open end. The resilient portion has an inner surface and a second open end. Another step comprises opening the split cavity to permit the resilient portion and the second open end of the bellows part to be stripped from the core pin. A further step comprises passing compressed gas through the core pin to the inner surface of the resilient portion while the first and second open ends of the resilient bellows part are closed off, thereby expanding the resilient portion outwardly from the core pin. Yet another step comprises pushing the substantially rigid portion of the resilient bellows part by the stripper rod axially away from the core pin. The pushing of the stripper rod away from the core pin causes compressed gas to be admitted between the core pin and the resilient portion of the bellows part to expand the resilient portion and to thereby aid in stripping the resilient bellows part from the core pin. The final step comprises ejecting the substantially rigid portion of the resilient bellows part from the stripper rod after the resilient bellows part has been stripped from the core pin.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
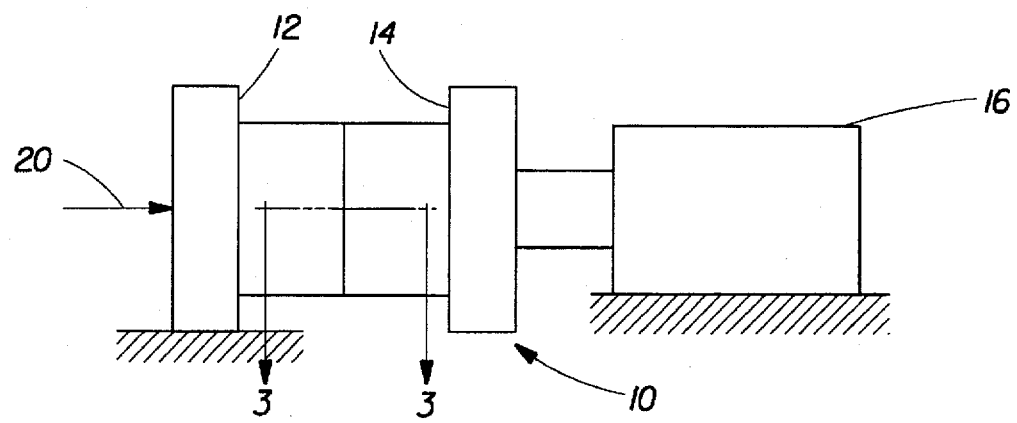
FIG. 1 is a front elevation view of a preferred method of the present invention for stripping an open ended bellows part from an injection mold, disclosing a fixed end and a movable end of an injection molding machine in the closed position.
Figure 2:
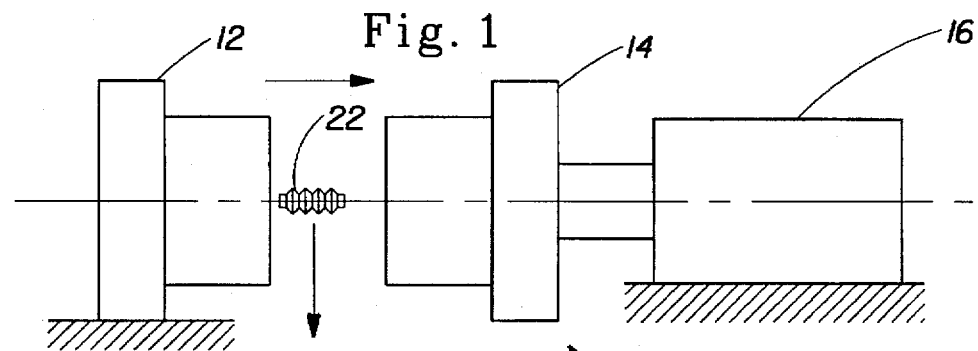
FIG. 2 is a front elevation view thereof, disclosing the movable end of an injection molding machine in an opened position with a bellows part being ejected.

Referring now to the drawings, and more particularly to FIGS. 1 and 2, there is shown an injection molding apparatus, which provides a method of the present invention for stripping an open ended bellows part from an injection mold and is generally indicated as 10. Injection molding machine 10 has a fixed end 12 and a movable end 14 which is actuated by a hydraulic cylinder 16. FIG. 1 shows an arrow 20 to indicate where the injection of plastic enters the mold section of the machine to form a bellows part 22. FIG. 2 shows fixed end 12 and movable end 14 axially separated when hydraulic cylinder 16 is retracted, ejecting bellows part 22 therefrom. Such a machine is well known in the art.

In a particularly preferred embodiment, machine 10 is an Arburg 40 ton toggle press, Polyronica U version, made by Arburg, Inc. of Kensington, Conn. The preferred mold is a four cavity mold with each of the four cavities operating similar to the single cavity operation illustrated herein.

Figure 3:
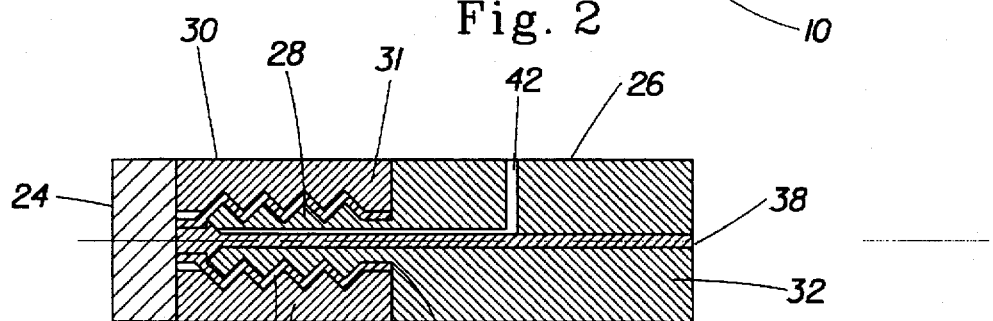
FIG. 3 is a sectioned top plan view of fixed and movable portions of the mold of the present invention, taken along section line 3—3 of FIG. 1, showing the cavity of the mold closed around a core pin and a stripper rod, and a bellows part newly formed therebetween.

The present invention is the method by which a fixed mold portion 24 and a movable mold portion 26 operate within the machine to form and strip an open ended bellows part from the machine. FIG. 3 shows mold portions 24 and 26 in a closed position. Movable mold portion 26 has a core pin 28 having a shape of an inner surface of a bellows and a split cavity 30 having a outer shape of a bellows when closed around core pin 28. Split cavity 30 is preferably split along a plane parallel to a longitudinal axis (not shown) of the core pin such that two halves 31 and 33 may be opened perpendicular to the longitudinal axis. Split cavity 30 can open in any direction, however, as long as such opening results in halves 31 and 33 clearing the molded bellows part so that the bellows part can be stripped from core pin 28 as hereinafter described.

Figure 6:
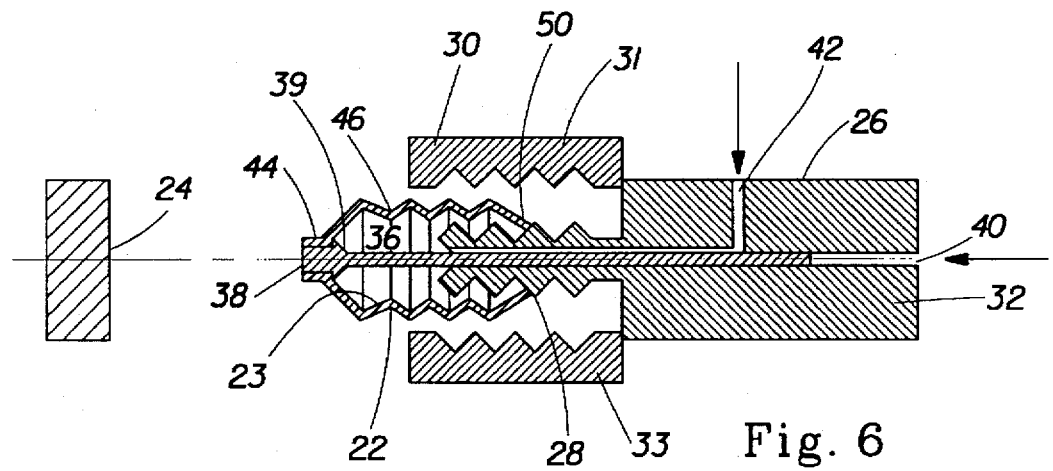
FIG. 6 is a sectioned top plan view thereof, similar to FIG. 3, showing further axial separation between the movable end and fixed end of the mold, wherein the bellows part is pushed by the stripper rod from the core pin while the bellows part is expanded by compressed gas.

Core pin 28 has a core body 32 and a free end 34. Free end 34 has a valve seat 36 for a popper valve, which is best seen in FIG. 6. Because the molded part is a bellows, core pin 28 has a series of undercuts along its length which cause removal of the molded part from the core pin to be difficult.

Movable mold portion 26 also has a stripper rod 38 which has a poppet valve 39 at one end, which seats against valve seat 36. Stripper rod 38 is substantially centered within core pin 28 in a longitudinal clearance hole 40 through core pin 28. Poppet valve 39 is opened and closed by sliding stripper rod 38 axially in clearance hole 40, either mechanically or by compressed gas pressure applied to the end of the stripper rod. Stripper rod 38 is biased toward valve seat 36 by a means not shown in order to maintain poppet valve 39 normally closed. The purpose of the poppet valve is to admit compressed gas (from a source not shown), which flows from an inlet 42 in core body and through clearance hole 40 along the outside of stripper rod 38 to valve seat 36, and finally to an inner surface 23 of the resilient portion of bellows part 22 to expand the bellows part for stripping it from core pin 28. Stripper rod 38 which has poppet valve 39 seated closed during molding also serves as an inner core pin which forms an open end of bellows part 22. Fixed mold portion 24 is pressed against the end of stripper rod 38 during bellows part injection molding.

In order for the operation of the mold components of the present invention to function properly, bellows part 22 has a first open end 44, which is more rigid than the resilient corrugated portion 46 of the bellows. Open end 44 has a smaller diameter and is generally thicker than resilient portion 46.

Bellows part 22 has a second open end 50, which is generally the larger diameter of the two open ends so that it may be more easily stripped off the core pin. Bellows part 22 is molded of a resilient material such that the bellows will expand somewhat under the pressure of compressed gas to enable stripping it from the core pin. In a particularly preferred embodiment of the present invention, bellows part 22 is molded of ethylene vinyl acetate resin, grade UE632 available from Quantum Chemicals, of Cincinnati, Ohio. Injection molding machine conditions are: 375° F. nozzle temperature, 375° F. front temperature, 350° F. middle temperature, 300° F. rear temperature, 335° F. actual melt temperature, 1000 psi first stage injection pressure, 800 psi second stage injection pressure, 100 psi back pressure, 1.5 second injection time, 5 second hold time, 10 second cooling time, 0.1 second recycle time, 1 second injection delay time, and 6.5 second machine movement time. Resilient portion 46 has a maximum diameter of about 19 mm and a length of about 25 mm. First open end 44 is about 9 mm in diameter and second open end 50 is about 17 mm in diameter.

Figure 4:
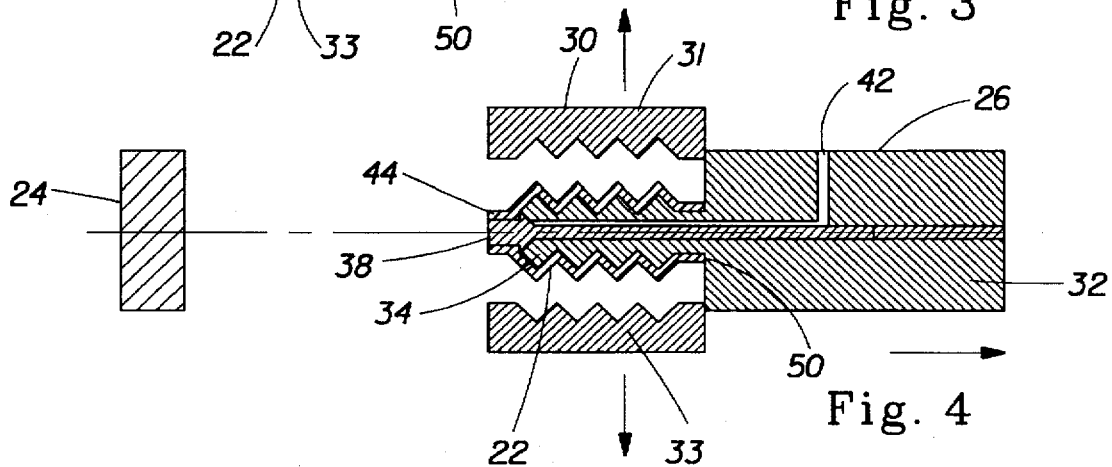
FIG. 4 is a sectioned top plan view thereof, similar to FIG. 3, showing a split cavity opening perpendicular to the axis of the bellows part while the movable end of the mold moves axially away from the fixed end.

FIG. 4 shows the first step in stripping the bellows part from the core pin. Split cavity 30 opens perpendicular to the longitudinal axis of core pin 28 to provide a gap between split cavity 30 and bellows part 22 so that bellows part 22 may be expanded. Meanwhile, movable mold portion 26 moves axially away from fixed mold portion 24.

Figure 5:
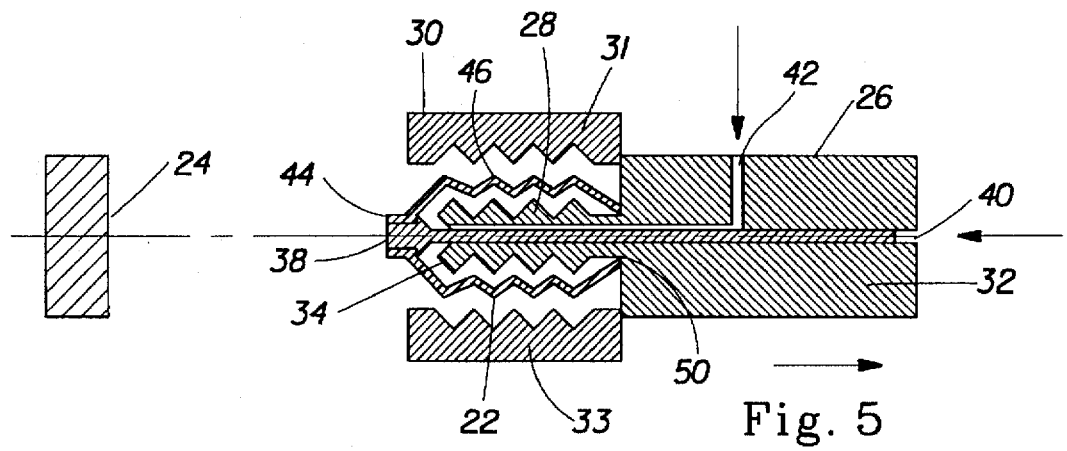
FIG. 5 is a sectioned top plan view thereof, similar to FIG. 3, showing the stripper rod moving out of engagement with the core pin, thereby acting as a poppet valve and opening to permit compressed gas to expand the resilient bellows part.

FIG. 5 shows the beginning of axial movement of stripper rod 38 in clearance hole 40 to clear valve seat 36 and allow compressed gas to expand the resilient portion 46 of bellows part 22. First open end 44 is maintained closed by stripper rod 38 filling open end 44. Second open end 50 remains closed at core body 32 when compressed gas expands the bellows. Annular second end 50 is slightly more rigid than the corrugated part of the bellows. Bellows part 22 is stripped axially from core pin 28 by stripper rod 38 pushing against an inner ledge of first open end 44. Meanwhile, second open end 50 of bellows part 22 slides along core pin 28 and maintains a mostly gas-tight seal with the core pin. Even if some compressed gas leaks out from bellows part 22 at second open end 50, there is sufficient compressed gas flow to maintain bellows part 22 expanded sufficiently for stripping it off core pin 28. Typical compressed gas is compressed air at 60–80 psig.

FIG. 6 shows further axial separation of fixed mold portion 24 and movable mold portion 26. Bellows part 22 is pushed further off core pin 28 by stripper rod 38 while bellows part 22 remains expanded by compressed gas. Poppet valve 39 remains open until bellows part 22 is stripped from core pin 28.

Figure 7:
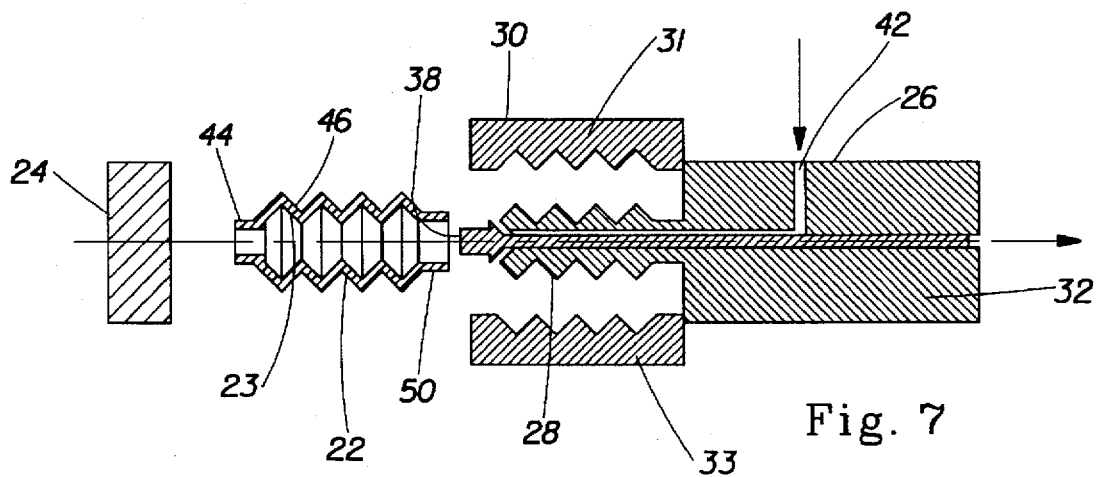
FIG. 7 is a sectioned top plan view thereof, similar to FIG. 3, showing the split cavity in the open position, the core end of the mold separated from the fixed end, the bellows part stripped off the core pin, and the stripper rod returning to seat against the core pin to close the poppet valve.

FIG. 7 shows bellows part 22 stripped from core pin 28. Stripper rod 38 is returning to close popper valve 39 against valve seat 36 of core pin 28, thereby stopping the flow of compressed gas. Split cavity halves 31 and 33 begin closing toward core pin 28 to begin a new bellows part making cycle. Compressed air blow off is a typical means for ejecting bellows part 22 from stripper rod 38. However, means for such blow off is not shown. Alternatively, just the retraction of stripper rod 38 may be used to clear bellows part 22 from the stripper rod. When second open end 50, no longer expanded by compressed gas, contacts free end 34 of core pin 28 as stripper rod 38 retracts, open end 44 of bellows part 22 is pushed off stripper rod 38.

An alternative to the operation of fixed and movable mold portions 24 and 26 could allow split cavity 30 to remain with fixed mold portion 24 instead of with movable mold portion 26. Since split cavity 30 may open perpendicular to the longitudinal axis of the core pin before any axial separation occurs, no other cycle changes would be necessary to accommodate such an alternative.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method for stripping a resilient bellows part from an injection mold comprising the steps of:
   a) injection molding a resilient bellows part around a core pin and a stripper rod while a split cavity surrounds said core pin and said stripper rod, said core pin and said stripper rod having a substantially colinear longitudinal axis, said resilient bellows part having a substantially rigid first open end and a resilient second open end;
   b) opening said split cavity to permit said resilient bellows part to be stripped from said core pin;
   c) expanding said resilient bellows part radially outward from said core pin;
   d) pushing said resilient bellows part at said substantially rigid first open end by said stripper rod to remove said resilient bellows part from said core pin while said resilient bellows part is expanded outwardly from said core pin, said stripper rod being mechanically operated as a poppet valve to release compressed gas to expand said resilient bellows.

2. The method of claim 1 wherein said core pin has a clearance hole connected to a source of compressed gas, said clearance hole gaining fluid communication with said resilient bellows part when said stripper rod moves axially away from said core pin to push said substantially rigid first open end, said step of expanding said resilient bellows part comprising passing compressed gas from said source through said clearance hole of said core pin to said resilient bellows part.

3. A method for stripping a resilient bellows part from an injection mold comprising the steps of:
   a) injection molding a resilient bellows part, said resilient bellows part having a resilient portion located between a core pin and a split cavity and a substantially rigid portion located between a mechanically operated stripper rod and said split cavity, said substantially rigid portion having a first open end, said resilient portion having an inner surface and a second open end, said stripper rod being biased against said core pin to create a normally closed poppet valve;
   b) opening said split cavity to permit said resilient portion and said second open end of said resilient bellows part to be stripped from said core pin;
   c) passing compressed gas through said core pin upon opening of said poppet valve, said compressed gas passing to said inner surface of said resilient portion while said first and second open ends of said resilient bellows part are closed off, thereby expanding said resilient portion outwardly from said core pin;
   d) pushing said substantially rigid portion of said resilient bellows part by said mechanically operated stripper rod axially away from said core pin while admitting compressed gas between said core pin and said resilient portion of said resilient bellows part to expand said resilient portion and to thereby aid in stripping said resilient bellows part from said core pin; and
   e) ejecting said substantially rigid portion of said resilient bellows part from said stripper rod after said resilient bellows part has been stripped from said core pin.

\* \* \* \* \*